United States Patent
Hosotani et al.

(10) Patent No.: US 6,498,735 B2
(45) Date of Patent: Dec. 24, 2002

(54) SWITCHING POWER SUPPLY UNIT (75) Inventors: Tatsuya Hosotani, Muko (JP); Hiroshi Takemura, Muko (JP)

(73) Assignee: Murata Manufacturing Co., Ltd., Kyoto (JP)

(*) Notice: Subject to any disclaimer, the term of this patent is extended or adjusted under 35 U.S.C. 154(b) by 0 days.

(21) Appl. No.: 10/021,252

(22) Filed: Dec. 19, 2001

(65) Prior Publication Data

US 2002/0110003 A1 Aug. 15, 2002

(30) Foreign Application Priority Data

Dec. 28, 2000 (JP) .......................... 2000-401807
Nov. 28, 2001 (JP) .......................... 2001-362970

(51) Int. Cl.[7] .................... H02M 3/335; H02M 3/315
(52) U.S. Cl. ................. 363/21.15; 363/25; 363/56.1; 363/134
(58) Field of Search .................. 363/21.12, 21.14, 363/21.15, 21.16, 21.17, 21.18, 41, 56.01, 56.1, 56.11, 24, 25, 134

(56) References Cited

U.S. PATENT DOCUMENTS

| 4,443,838 A | * | 4/1984 | Yamada | ........................ 331/112 |
|---|---|---|---|---|
| 4,630,186 A | * | 12/1986 | Kudo | ........................ 323/289 |
| 4,758,937 A | * | 7/1988 | Usui et al. | ........................ 363/19 |
| 4,862,338 A | * | 8/1989 | Tanaka | ........................ 363/19 |
| 5,012,399 A | * | 4/1991 | Takemura et al. | .......... 323/902 |

* cited by examiner

Primary Examiner—Bao Vu
(74) Attorney, Agent, or Firm—Keating&Bennett, LLP (57) ABSTRACT A switching power supply unit includes first and second switching circuits which alternately turn first and second switching elements on and off with an intermediate period in which both are turned off, and energy is stored in a primary winding of a transformer during an ON period of the first switching element and the energy is discharged from a secondary winding of the transformer during an OFF period of the first switching element. A control circuit includes an OFF period extending circuit connected to a control terminal of the first switching element, such that a transistor remains turned on for a desired period even after the energy has been discharged from the secondary winding, extending the OFF period of the first switching element for the desired period. In a light load operation, a phototransistor in the second control circuit is turned on so that the ON period of the second switching element will be shorter than the time required to discharge the energy from the secondary winding.

23 Claims, 12 Drawing Sheets

SWITCHING POWER SUPPLY UNIT

BACKGROUND OF THE INVENTION

1. Field of the Invention

The present invention relates to switching power supply units, and more specifically, to a switching power supply unit that improves efficiency and performance in a light load operation.

2. Description of the Related Art

Switching power supply units related to the present invention are disclosed in U.S. Pat. Nos. 6,061,252 and 6,201,713.

Figure 1:
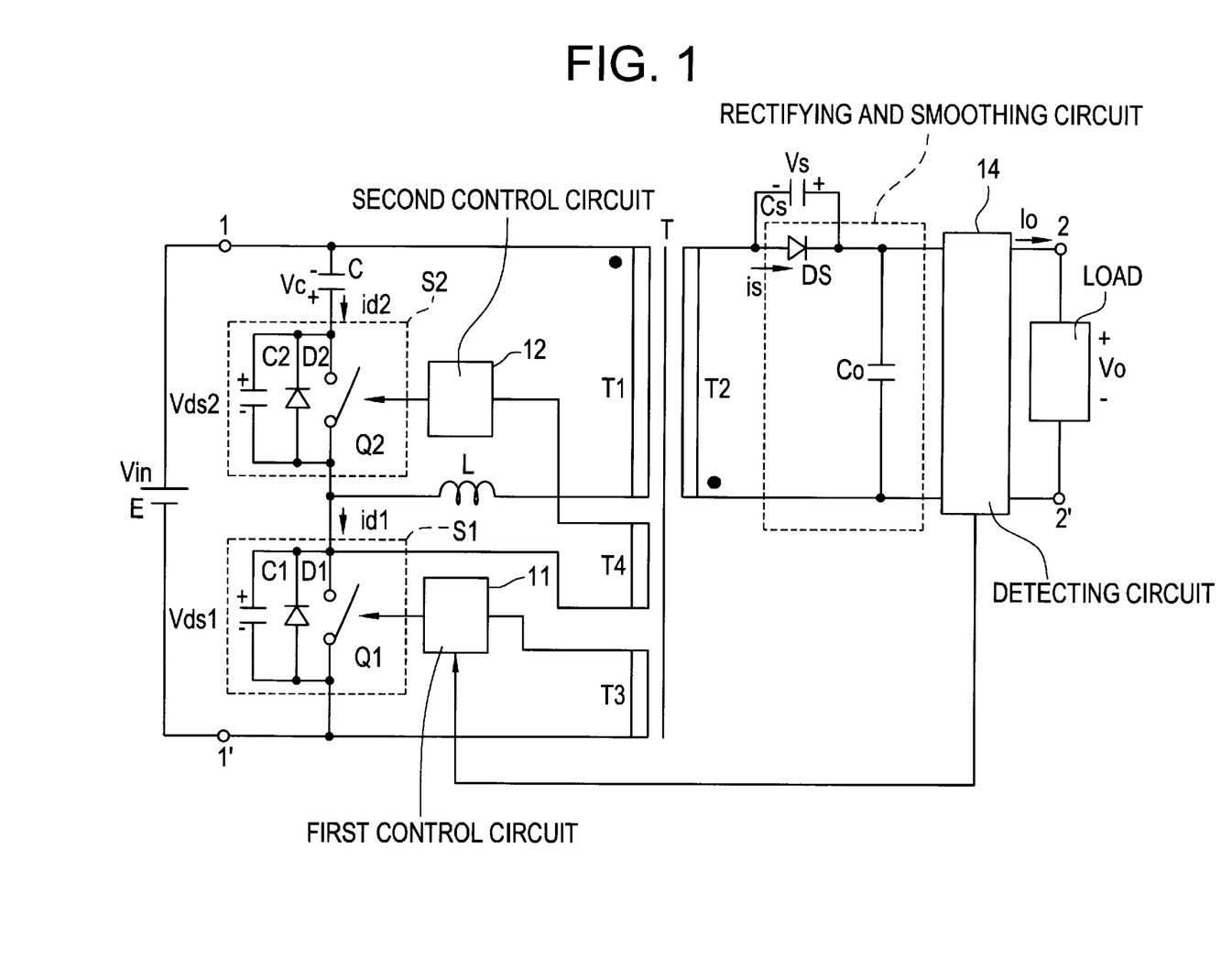
FIG. 1 is a diagram of a conventional switching power supply unit.

FIG. 1 shows a diagram of a switching power supply unit disclosed in U.S. Pat. No. 6,061,252.

In the switching power supply unit, a transformer T having a primary winding T1 and a secondary winding T2, a first switching circuit S1, and an input power supply E are connected in series, and a series circuit of a second switching circuit S2 and a capacitor C is connected in parallel to the primary winding T1 of the transformer T. Furthermore, a rectifying and smoothing circuit including a rectifier element Ds is connected to the secondary winding T2 of the transformer T, and a capacitor Cs is connected in parallel to the rectifier element Ds. Furthermore, the transformer T includes a first drive winding T3 and a second drive winding T4. The first drive winding T3 is connected to a first control circuit 11 and the second drive winding T4 is connected to a second control circuit 12. The control circuits 11 and 12 which constitute a switching control circuit control the ON/OFF of the first and the second switching elements Q1 and Q2, respectively.

The first switching circuit S1 is defined by a parallel connection circuit including a first switching element Q1, a first diode D1, and a first capacitor C1. The second switching circuit S2 is defined by a parallel connection circuit including a second switching element Q2, a second diode D2, and a second capacitor C2. L indicates a leakage inductor in the primary winding T1 or an inductor that is connected separately.

In the configuration described above, the first and the second control circuits 11 and 12 constituting the switching control circuit control the first switching circuit S1 and the second switching circuit S2 to alternately turn the switching circuits S1 and S2 on and off with an intermediate period in which both of the switching circuits S1 and S2 are turned off, such that energy is stored in the primary winding T1 of the transformer T during an ON period of the first switching circuit S1 and the energy is discharged from the secondary winding T2 of the transformer T during an OFF period of the first switching circuit S1. The operation cycle is repeated such that energy is received from the secondary winding T2 and a power is supplied to the load. The first and the second control circuits 11 and 12 include transistors connected to the control terminals of the switching elements Q1 and Q2, and time constant circuits connected to the control terminals of the transistors, so that the circuits control when the switching elements Q1 and Q2 are turned on and off.

Figure 2:
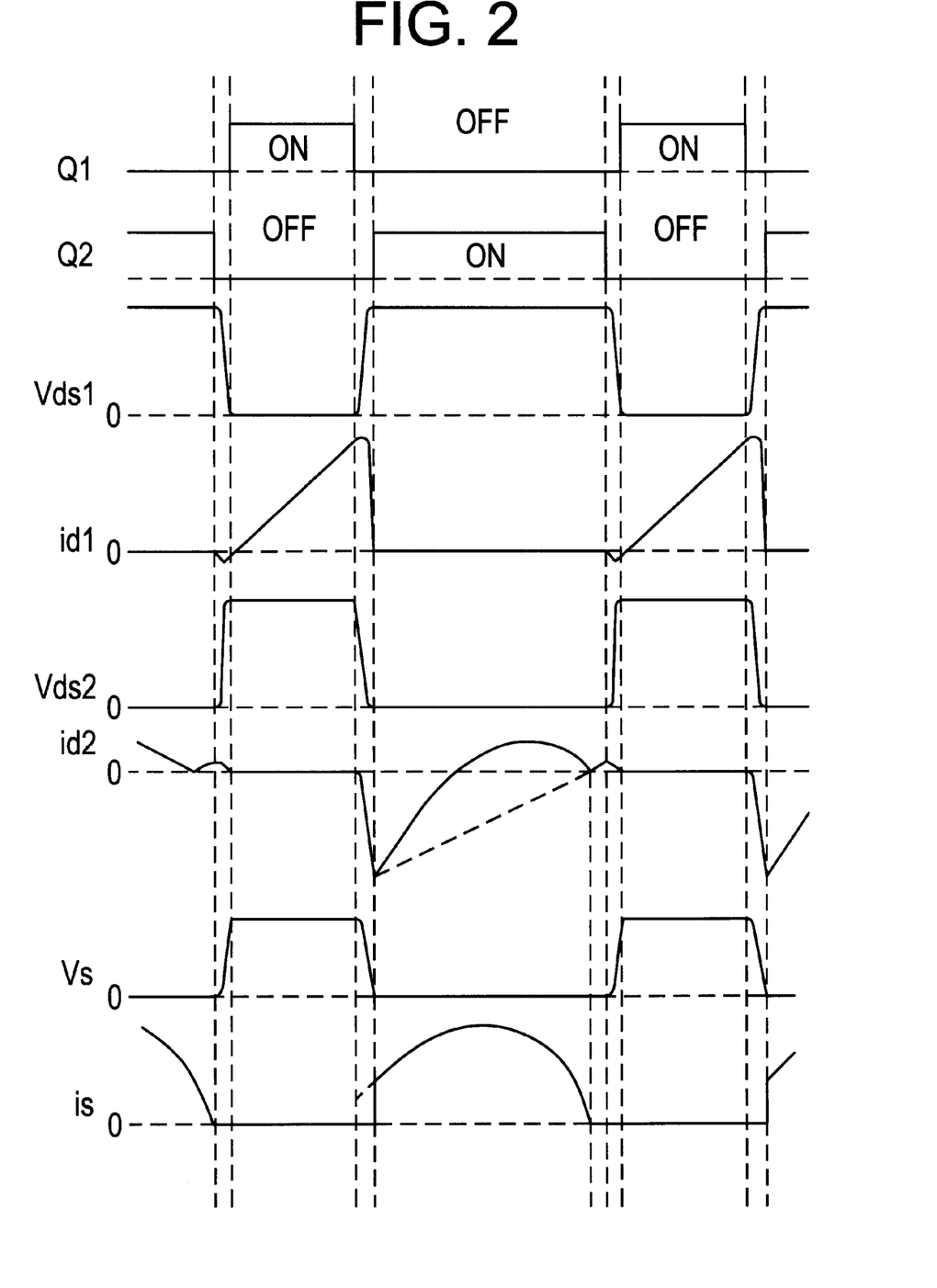
FIG. 2 is an operation waveform chart of the conventional switching power supply unit illustrated in FIG. 1.

FIG. 2 is an operation waveform chart of the switching power supply unit. Referring to FIG. 2, Q1 and Q2 indicate when the switching elements Q1 and Q2 are turned on and off, respectively. Vds1 and Id1 indicate a voltage across and a current through the switching element Q1, respectively. Vds2 and Id2 indicate a voltage across and a current through the switching element Q2, respectively. Vs and Is indicate a voltage across the rectifier element Ds and a current through the secondary winding T2, respectively.

In the configuration described above, when the first switching element Q1 is turned off, a voltage is generated on the drive winding T4 for the second switching element Q2, whereby the second switching element Q2 is turned on. Then, the transistor in the control circuit 12 is turned on after a certain period of time determined by the time constant circuit has elapsed, whereby the second switching element Q2 is turned off. At this time, a voltage is generated in the drive winding T3 for the first switching element Q1 when the rectifier element Ds on the secondary side is turned off if the rectifier element Ds has been turned on, or when the second switching element Q2 is turned off if the rectifier element Ds has been turned off. That is, a voltage is generated when both of the second switching element Q2 and the rectifier element Ds are turned off, whereby the first switching element Q1 is turned on. By the operation described above, the first switching element Q1 and the second switching element Q2 are controlled to alternately turn on and off with an intermediate period in which both of the switching elements Q1 and Q2 are turned off, such that an energy which is stored on the primary winding of the transformer T during an ON period of the first switching element Q1 is output from the secondary winding T2 as electric energy during an OFF period of the first switching element Q1.

In the switching power supply unit described above, a zero-voltage switching operation is performed in which the first and the second switching elements Q1 and Q2 are turned on after voltages applied across each of the switching elements drops to zero. This reduces switching loss and prevents switching surge, to thereby improve efficiency and performance.

Figure 3:
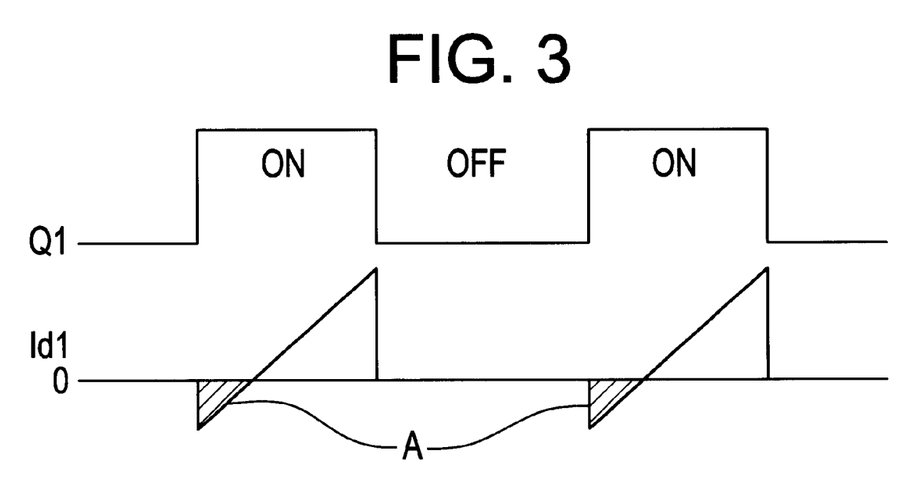
FIG. 3 is a waveform chart where circulating current is present.

However, in the switching power supply unit described above, when the load is light, a portion of the energy stored in the primary winding T1 of the transformer T during an ON period of the first switching element Q1 is regenerated on the input side. In FIG. 3, regenerative current is shown as an area indicated by A. The regenerative current becomes a circulating current that does not contribute to output. If the ON period of the switching element Q2 is fixed, the circulating current increases as the output power decreases (as the load becomes lighter). A large circulating current greatly increases conduction loss in the first and the second switching elements Q1 and Q2 and the transformer T, resulting in greatly reduced efficiency under light load operation.

Accordingly, in a switching power supply unit according to U.S. Pat. No. 6,201,713, circulating current is reduced by shortening the ON period of the second switching element Q2 in a light load operation, thereby improving efficiency. However, a reduction in circulating current causes an increase in the switching frequency. This increase in switching frequency produces an increase in switching loss including loss in drive circuits for switching elements.

That is, if circulating current is large, switching loss is small because the switching frequency is low. However, conduction loss associated with the circulating current increases. On the other hand, if circulating current is reduced, conduction loss is reduced. However, switching loss increases due to the higher switching frequency.

SUMMARY OF THE INVENTION

To overcome the above-described problems, preferred embodiments of the present invention provide a switching power supply unit that reduces circulating current and thereby reduces conduction loss under light load operation or no load operation, and that also reduces switching loss and switching surge, thus improving the efficiency and reducing the size and weight of a switching power supply unit.

A preferred embodiment of the present invention provides a switching power supply unit including a first switching circuit including a parallel connection circuit that includes a first switching element, a first diode, and a first capacitor; a second switching circuit including a parallel connection circuit that includes a second switching element, a second diode, and a second capacitor; a capacitor connected in series to the second switching circuit, the series circuit of the capacitor and the second switching circuit are connected to one end of the first switching circuit; a transformer including a primary winding and a secondary winding; a rectifying and smoothing circuit including a rectifier element, connected to the secondary winding of the transformer; an input power supply connected in series to the first switching circuit and the transformer; and a switching control circuit which alternately turns the first switching element and the second switching element on and off with an intermediate period in which both of the switching elements are turned off, such that energy is stored in the primary winding of the transformer during an ON period of the first switching element and the energy is discharged from the secondary winding of the transformer during an OFF period of the first switching element; wherein the switching control circuit includes an OFF period extending device which permits an OFF period of the first switching element to be continued for a desired amount of time even after the energy has been discharged from the secondary winding, thereby lowering the switching frequency.

According to the prior art, when energy is discharged from the secondary winding, a voltage is generated in the drive winding for the first switching element when the rectifier element in the rectifying and smoothing circuit is turned off or when the second switching element is turned off. That is, the voltage is generated when both of the second switching element and the rectifier element are turned off, whereby the first switching element is turned on via the first control circuit.

According to the above-described preferred embodiment of the present invention invention, the OFF period extending device that permits the OFF period of the first switching element to be continued for the desired amount of time is provided. Thus, the first switching element is turned on with a delay, thereby lowering the switching frequency, whereby switching loss is reduced. Furthermore, the series circuit of the second switching element and the capacitor defines a voltage clamping circuit, thereby preventing a voltage surge across the first and the second switching elements. This allows for the use of low-voltage switching elements. Because low-voltage switching elements have small resistance values when turned on and are inexpensive, use of low-voltage switching elements greatly reduces loss, greatly improves efficiency, and greatly reduces cost.

The switching control circuit of another preferred embodiment of the present invention preferably includes a device for limiting an ON period of the second switching element to less than the time required to discharge the energy from the secondary winding.

By providing the device for limiting the ON period of the second switching element to less than the time required to discharge the energy from the secondary winding, i.e., a device for decreasing regenerative current, the discharge time of the capacitor connected in series to the second switching circuit is reduced in light load operation or no load operation. This reduces circulating current, and thereby greatly reduces conduction loss associated with the circulating current.

The OFF period extending device is defined by a transistor connected in series to the control terminal of the first switching element, the transistor remaining turned off even after the energy has been discharged from the secondary winding, such that the OFF period of the first switching element is extended for a desired amount of time.

For example, a device for detecting whether the load is light or heavy is provided for the secondary winding of the transformer, such that the transistor is controlled to remain turned off even after the energy has been discharged from the secondary winding if a light load is detected. According to this arrangement, a single transistor is required to define a switching element for driving the switching elements. Thus, the number of components is reduced, thus greatly reducing the size, weight and cost of the switching power supply unit.

Alternatively, the OFF period extending device may be defined by a transistor connected in parallel to the control terminal of the first switching element, the transistor remaining turned on even after the energy has been discharged from the secondary winding, such that the OFF period of the first switching element is extended for a desired time.

In contrast to the arrangement described above, in which the transistor is connected in series to the control terminal of the first switching element, in this arrangement, the transistor is connected in parallel to the control terminal of the first switching element, which also achieves the same advantages described above.

The switching control circuit preferably includes a transistor connected to the control terminal of the first switching element, and a time constant circuit defined by a capacitor and an impedance circuit connected to the control terminal of the transistor, such that the output voltage is controlled by controlling the ON period of the first switching element.

The time constant circuit is provided to turn on the transistor after a desired period of time elapses from an increase in voltage in the drive winding and to thereby quickly turn off the first switching element. The output voltage is easily controlled by adjusting the time constant of the time constant circuit, thus reducing the size, weight and cost of the switching power supply unit.

Furthermore, the switching control circuit preferably includes a transistor connected to the control terminal of the second switching element, and a time constant circuit including a capacitor and an impedance circuit connected to the control terminal of the transistor, such that the discharge current from the capacitor connected in series to the second switching circuit is controlled by controlling the ON period of the second switching element.

In this arrangement as well, similar to the arrangement described above, the output voltage is controlled by adjusting the time constant of the time constant circuit, thus reducing the size, weight and cost of the switching power supply unit.

The OFF period extending device preferably operates in a light load operation, and does not operate in at least a heavy load operation.

The OFF period extending device produces optimal operation in accordance with the load when it operates in a light load operation in response to a signal indicating detection of the light load operation and does not operate in at least a heavy load operation. This achieves highly efficient operation in no load, light load, and heavy load operations.

The first switching element and the second switching element preferably include field-effect transistors.

By constructing the first and the second switching elements using field-effect transistors, parasitic capacitances of the field-effect transistors are used as the first capacitor and the second capacitor, and parasitic diodes of the field-effect transistors are used as the first diode and the second diode. This eliminates the need to provide the diodes and the capacitors as separate components, thus further reducing the size, weight and cost of the switching power supply unit.

The transformer preferably includes a first drive winding and a second drive winding for generating voltages that turn on the first and the second switching elements to produce a self-excited oscillation.

Because the drive windings are provided in the transformer to produce a self-excited oscillation, ICs such as an oscillation circuit and a control circuit are not required, thus further reducing the size, weight and cost of the switching power supply unit.

The switching power supply unit may further include a leakage inductor induced in a magnetic circuit including the primary winding and the secondary winding of the transformer or an inductor connected in series to the transformer, wherein the inductor and the capacitor connected in series to the second switching element define an oscillation circuit.

The capacitor and the leakage inductor in the transformer or the inductor separately connected define an oscillation circuit that generates oscillation. Thus, energy stored in the inductor is output to avoid loss, and improve efficiency. In addition, the second switching element is turned off with a zero current to reduce switching loss.

Preferably, the rectifying and smoothing circuit includes a diode as the rectifier element, and a capacitive impedance is connected in parallel to the diode.

By connecting the capacitive impedance to the rectifier element, the reverse recovery loss of the rectifier is greatly reduced and efficiency is greatly improved. In addition, energy transmitted to the secondary winding is supplied to the load via the capacitive impedance without passing the rectifier element, so that rectification loss is reduced. Furthermore, the capacitance of the first capacitor and the second capacitor in the first switching circuit and the second switching circuit respectively, is greatly reduced.

Other features, elements, steps, characteristics and advantages of the present invention will become apparent from the following detailed description of preferred embodiments with reference to the attached drawings.

BRIEF DESCRIPTION OF THE DRAWINGS

FIGS. 5A and 5B are operation waveform charts of light load operations of the conventional switching power supply unit, FIG. 5A is where circulating current is not reduced and FIG. 5B is where circulating current is reduced;

DETAILED DESCRIPTION OF PREFERRED EMBODIMENTS

Figure 4:
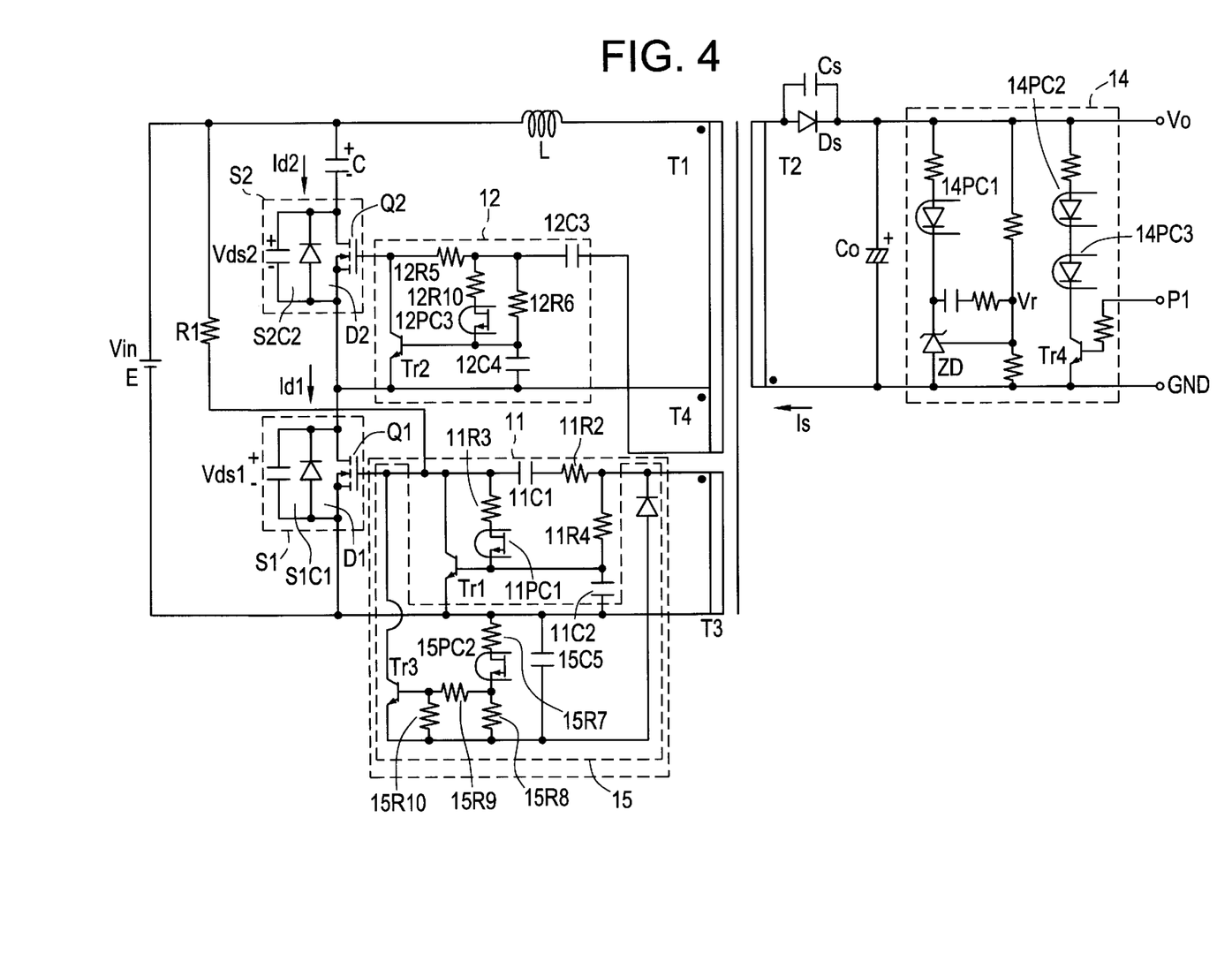
FIG. 4 is a circuit diagram of a switching power supply unit according to a preferred embodiment of the present invention.

FIG. 4 is a circuit diagram of a switching power supply unit according to a preferred embodiment of the present invention.

A transformer T includes a primary winding T1, a secondary winding T2, a first drive winding T3, and a second drive winding T4. The primary winding T1 of the transformer T, a first switching circuit S1, and an input power supply E having an input voltage Vin are connected in series, and a series circuit of a second switching circuit S2 and a capacitor C is connected in parallel to a series circuit of a leakage inductor L and the primary winding T1.

A rectifying and smoothing circuit including a rectifier element Ds and a smoothing capacitor Co is connected to the secondary winding T2 of the transformer T.

A detecting circuit 14, which is connected on the output side of the rectifying and smoothing circuit, detects an output voltage. A light emitting device 14PC1 is connected to a shunt regulator ZD in series, and controls a current that flows through the light emitting device 14PC1, such that an input voltage on a reference voltage terminal Vr of the shunt regulator ZD (a division voltage of the output voltage Vo) is constant. A phototransistor 11PC1, which is photo-coupled to the light emitting device 14PC1, is connected to a first control circuit 11, as will be described below. Furthermore, the detecting circuit 14 includes a series circuit of a transistor Tr4 and light emitting devices 14PC2 and 14PC3. In a light load operation, an external signal is input to the control terminal P1 of the transistor Tr4 and the input of the external signal turns on the transistor Tr4. A phototransistor 15PC2, which is photo-coupled to the light emitting device 14PC2, is connected to an OFF period extending circuit 15 that is preferably included in the first control circuit 11, as will be described below. A phototransistor 12PC3, which is photo-coupled to the light emitting device 14PC3, is connected to a second control circuit 12, as will be described below.

The first switching circuit S1 preferably includes a parallel connection circuit of a first switching element Q1, a first diode D1, and a first capacitor S1C1, and in this preferred embodiment, the first switching element Q1 is preferably defined by a FET (field-effect transistor). Hereinafter, the first switching element Q1 will be referred to as a FET Q1. A second switching circuit S2 preferably includes a parallel connection circuit of a second switching element Q2, a second diode D2, and a second capacitor S2C2, and in this preferred embodiment, the second switching element Q2 is preferably defined by a FET (field-effect transistor). Hereinafter, the second switching element Q2 will be referred to as a FET Q2.

The first control circuit 11 included in a switching control circuit is connected between the drive winding T3 of the transformer T and the FET Q1. The first control circuit 11 preferably includes a transistor Tr1, a time constant circuit connected to the control terminal (the base) of the transistor Tr1, including resistors 11R4 and 11R3, the phototransistor 11PC1, and a capacitor 11C2, and a delaying circuit preferably defined by a series circuit of a capacitor 11C1 and a resistor 11R2. Furthermore, the phototransistor 11PC1 is connected to the control terminal of the transistor Tr1. Thus, when a voltage is generated on the first drive winding T3, the FET Q1 is turned on after a desired delay in the delaying circuit including the capacitor 11C1 and the resistor 11R2. Furthermore, from then on, after an elapse of time determined by the time constant circuit including the resistor 11R3, an impedance determined by the phototransistor 11PC1, and the capacitor 11C2, the transistor Tr1 is turned on, quickly turning off the FET Q1. When the output voltage of the secondary winding T2 increases, the transistor Tr1 is turned off sooner, which shortens the ON period of the FET Q1 so as to lower the output, and stabilize the output voltage.

The second control circuit 12 connected between the second drive winding T4 of the transformer T and the FET Q2 is included in the switching control circuit. The second control circuit 12 preferably includes a delaying circuit having a resistor 12R5 and a capacitor 12C3; a transistor Tr2 connected to the control terminal of the FET Q2; a time constant circuit connected to the control terminal of the transistor Tr2 including a resistor 12R6 and a capacitor 12C4; and the phototransistor 12PC3 connected to the control terminal of the transistor Tr2. Thus, when a voltage is generated in the drive winding T4, the voltage is applied to the control terminal of the FET Q2 via the delaying circuit including the resistor 12R5 and the capacitor 12C3, turning on the FET Q2. Furthermore, after an elapse of time determined by the time constant circuit including the resistor 12R6 and the capacitor 12C4, the transistor Tr2 is turned on, thereby quickly turning off the FET Q2.

As described above, in the control circuits 11 and 12 constituting the switching control circuits, the timing when each of the FETs Q1 and Q2 is turned on and off can be arbitrarily determined by using the delaying circuit and the time constant circuit. In addition, the operation of the phototransistor 11PC1 stabilizes the output voltage. A resistor R1 that is connected between the control terminal of the FET Q1 and the input power supply E preferably defines a starting resistor.

Furthermore, in the switching power supply unit, the OFF period extending circuit 15 is preferably provided in the first control circuit 11 constituting the switching control circuit, and the phototransistor 12PC3 is connected to the second control circuit 12, and the configurations thereof will be described below.

The OFF period extending circuit 15 includes a transistor Tr3 connected in parallel to the control terminal of the FET Q1, resistors 15R7 to 15R10 and the phototransistor 15PC2 connected to the control terminal of the transistor Tr3, and a capacitor 15C5. The capacitor 15C5 stores an electric charge during an OFF period of the FET Q1, the transistor Tr3 thereby remaining turned on even after energy has been discharged on the secondary side. Because the transistor Tr3 remains turned on, the FET Q1 is not turned on even when a voltage is generated on the drive winding T3. For the first time when the electric charge stored in the capacitor 15C5 has been discharged and the transistor Tr3 is turned off, the voltage on the drive winding T3 is applied to the control terminal of the FET Q1 via the first control circuit 11, or a voltage is applied to the control terminal of the FET Q1 via the starting resistor R1, whereby the FET Q1 is turned on. Because the FET Q1 is turned on with a delay as described above, the switching frequency is reduced, thus reducing switching loss. The operation of the transistor Tr3 is enabled when the phototransistor 15PC2 is turned on. Thus, when an external signal is input to the control terminal P1 of the transistor Tr4 in the detecting circuit 14, the OFF period extending circuit 15 controls the FET Q1 such that the FET Q1 is turned on with a delay. That is, under at least a light load operation, when an external signal is input to the control terminal P1, the OFF period extending circuit 15 operates such that the FET Q1 is turned on with a delay, thus lowering the switching frequency.

When the phototransistor 12PC3 provided for the transistor Tr2 in the second control circuit 12 is turned on, the transistor Tr2 is turned on sooner. That is, the ON period of the FET Q2 is shortened. When the ON period of the FET Q2 is shortened, the discharge time of the capacitor C is shortened, reducing circulating current, whereby conduction loss associated with the circulating current is greatly reduced. The extent of shortening the ON period of the FET Q2 can be determined by the resistance of the resistor R10 connected to the phototransistor 12PC3 or the impedance of the phototransistor 12PC3.

As described above, in light load operation, when an external signal is input to the control terminal P1, the OFF period extending circuit 15 operates and the phototransistor 12PC3 is turned on, thereby lowering the switching frequency and reducing circulating current. Thus, switching loss and conduction loss are greatly reduced, which significantly improves the efficiency of power conversion in light load operation.

Next, the operation of the switching power supply unit will be described.

First, operation in a state where no external signal is input to the control terminal P1 of the transistor Tr4 in the detecting circuit 14 will be described. This state is a rated load operation.

Upon power-up, the input voltage Vin is applied to the control terminal of the FET Q1 via the starting resistor R1, turning on the FET Q1. When the FET Q1 is turned on, a current flows through the primary winding T1 of the transformer T and generates a voltage on the drive winding T3. Thus, the FET Q1 is turned on such that an excitation energy is stored in the primary winding T1. Then, after a desired period of time that is set by the time constant circuit including the resistors 11R4 and 11R3, the impedance determined by the phototransistor 11PC1 and the capacitor 11C2 has elapsed, the transistor Tr1 is turned on which turns off the FET Q1. When the FET Q1 is turned off, the inductor L and the capacitor C start resonating on the primary side of the transformer T. During the resonation, the capacitor C is charged via the second diode D2 that is connected in parallel to the FET Q2, and the voltage generated on the drive winding T4 turns on the FET Q2. As described above, the inductor L and the capacitor C resonate, and the capacitor C is charged so as to achieve clamping, thereby preventing a voltage surge across the FET Q1. The capacitor C that has been charged is then discharged. Furthermore, when the FET Q1 is turned off, the electric energy is discharged from the secondary winding T2 via the rectifier element Ds. After the FET Q2 is turned on, after an elapse of the desired time set by the time constant circuit including the resistor 12R6 and the capacitor 12C4, the transistor Tr2 is turned on and the FET Q2 is turned off. At this time, a voltage is generated on the drive winding T3 when the rectifier element Ds on the secondary side of the transformer T is turned off if the rectifier element Ds has been turned on or when the FET Q2 is turned off if the rectifier element Ds has been turned off. That is, a voltage is generated when both of the FET Q2 and the rectifier element Ds are turned off, whereby the FET Q1 is turned on. Thus, the FET Q1 and the FET Q2 are controlled to alternately turn on and off with an intermediate period in which both are turned off, such that the energy stored on the primary winding T1 of the transformer T during an ON period of the FET Q1 is output from the secondary winding T2 as electric energy during an OFF period of the FET Q1.

In the rated load operation, because no external signal is input to the control terminal P1 of the transistor Tr4, the OFF period extending circuit 15 in the first control circuit 11 does not operate, and the phototransistor 12PC3 in the second control circuit 12 is turned off.

Next, a light load operation will be described.

When the load is light, in the first and the second control circuits 11 and 12 constituting the switching control circuits, the OFF period extending circuit 15 starts operating, and the phototransistor 12PC3 in the second control circuit 12 is turned on.

In the OFF period extending circuit 15, an electric charge is stored on the capacitor 15C5 during an OFF period of the FET Q1, so that the transistor Tr3 remains turned on even after the energy has been discharged from the secondary winding T2, whereby the FET Q1 is turned on with a delay even when a voltage is generated on the drive winding T3. After the electric charge stored on the capacitor 15C5 is discharged and the transistor Tr3 is turned off, from then on, the voltage on the drive winding T3, or a voltage via the starting resistor R1 is input to the control terminal of the FET Q1, whereby the FET Q1 is turned on. The subsequent operation is the same as in the rated load operation. As described above, in a light load operation, the FET Q1 is turned on with a delay so as to lower the switching frequency, thus reducing switching loss.

Furthermore, in the second control circuit 12, when the phototransistor 12PC3 is turned on, the capacitor 12C4 is charged more quickly. This causes the transistor Tr2 to be turned on sooner after a voltage is generated on the drive winding T4, whereby the ON period of the FET Q2 is shortened. When the ON period of the FET Q2 is shortened, the discharge time of the capacitor C is shortened, reducing circulating current, whereby conduction loss associated with the circulating current is greatly reduced. Furthermore, because the capacitor C is charged via the diode D2 or the FET Q2 when the FET Q1 is turned off, the capacitor C and the switching circuit S2 defines a clamping circuit that prevents a voltage surge across the FET Q1.

Figure 5A:
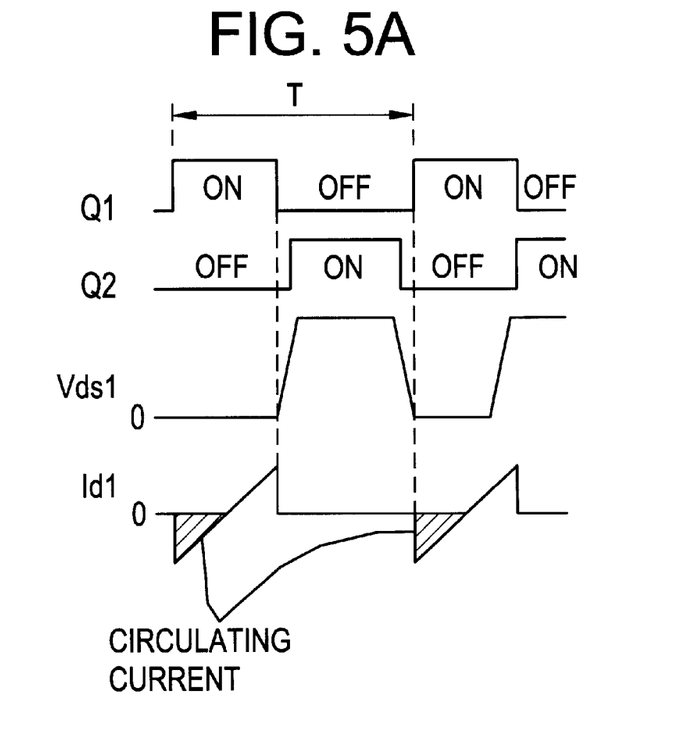
Figure 5B:
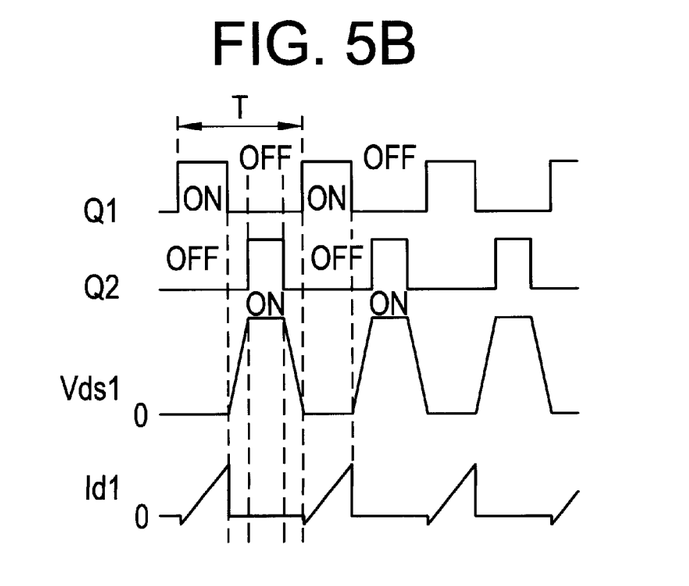
Figure 6A:
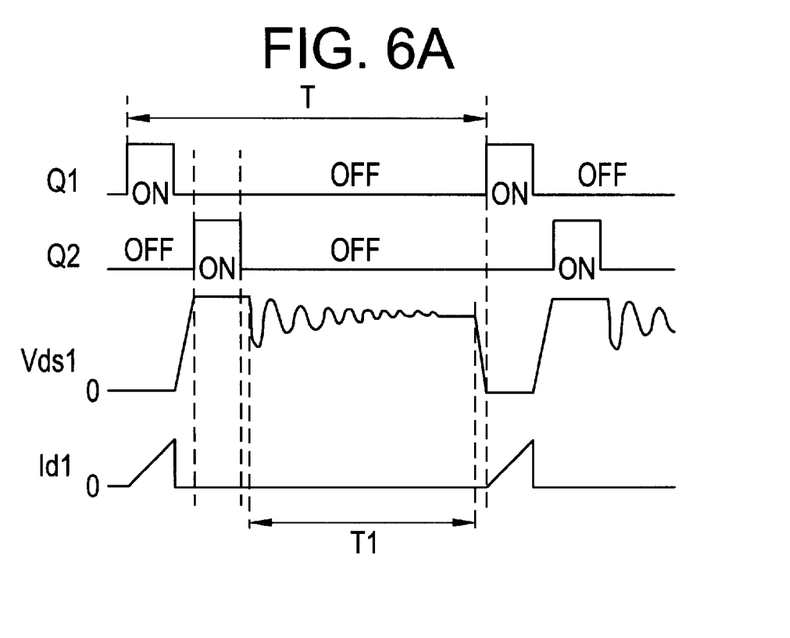
FIGS. 6A and 6B are waveform charts of light load operation and rated load operation of the switching power supply unit according to a preferred embodiment of the present invention, respectively.
Figure 6B:
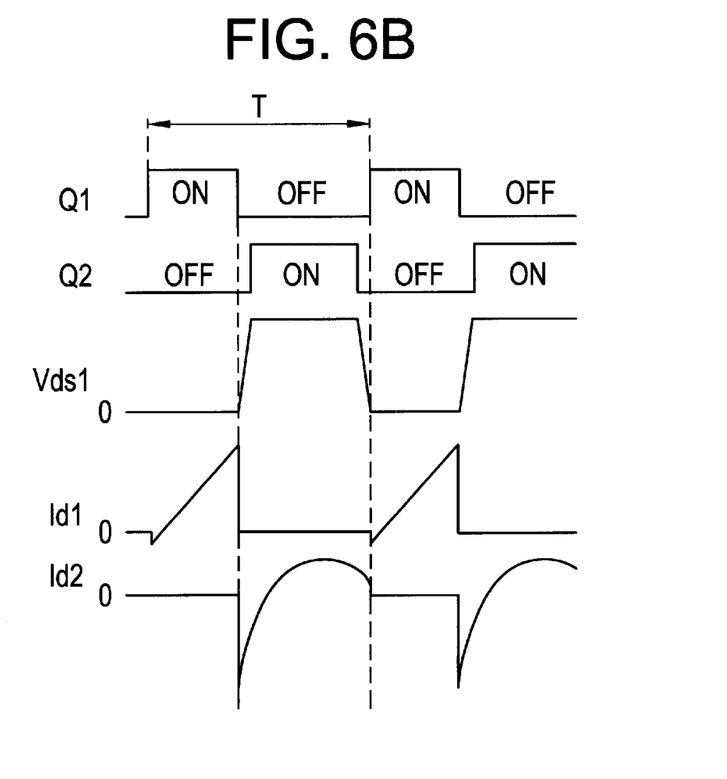

FIGS. 5A and 5B and FIGS. 6A and 6B show waveform charts that compare the operations of the conventional switching power supply unit and the switching power supply unit according to the present preferred embodiment. FIG. 5A shows a waveform chart for the conventional switching power supply unit where circulating current is not reduced, that is, a light load operation with the ON period of the FET Q2 fixed. FIG. 5B shows a waveform chart for the conventional switching power supply unit where circulating current is reduced, that is, light load operation with the ON period of the FET Q2 being varied in accordance with the load such that circulating current is minimized. FIG. 6A and FIG. 6B show, respectively, waveform charts of a light load operation and a rated load operation of the switching power supply unit according to the present preferred embodiment. In FIGS. 5A and 5B and FIGS. 6A and 6B, the same reference characters are used as in FIG. 2.

As will be readily understood from a comparison between FIG. 5A and FIG. 6A, in the conventional switching power supply unit, circulating current increases and conduction loss associated with the circulating current increases in a light load operation, whereas in the switching power supply unit according to the present preferred embodiment, circulating current is not present and conduction loss is greatly reduced. Furthermore, as will be readily understood from a comparison between FIG. 5B and FIG. 6B, in the conventional switching power supply unit, the switching frequency increases when circulating current is reduced in light load operation, thereby increasing switching loss including drive loss in switching elements. In contrast, in the switching power supply unit according to the present preferred embodiment, the OFF period extending circuit 15 extends the OFF period of the FET Q1 for a time T1. Thus, the switching period T in the switching power supply unit according to the present preferred embodiment is greater than that of the conventional switching power supply unit, whereby the switching frequency is significantly decreased and switching loss is greatly reduced.

Figure 7A:
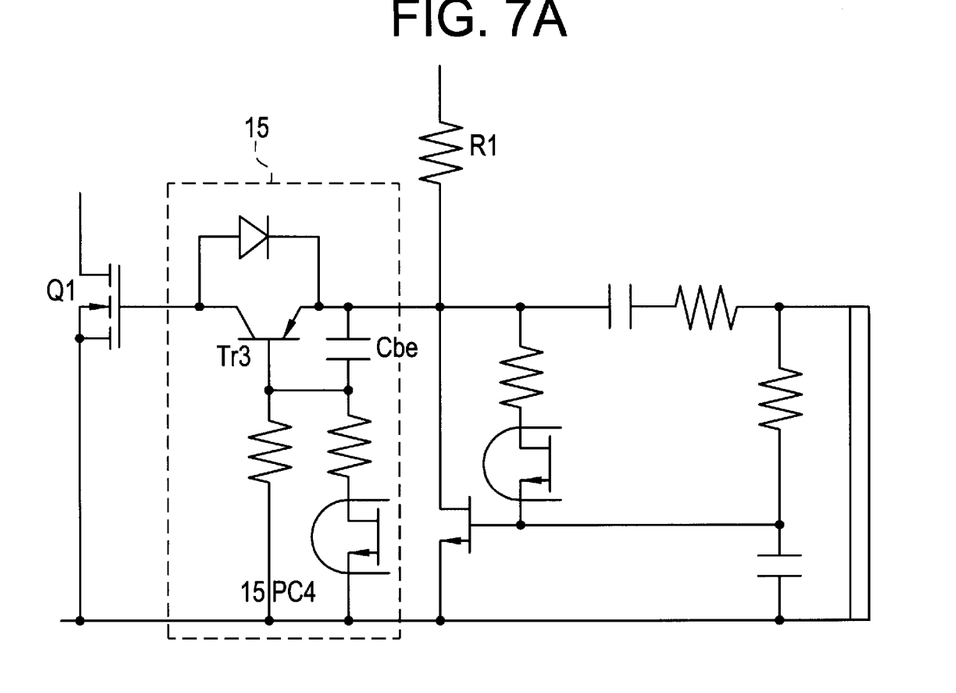
FIGS. 7A and 7B are circuit diagrams of modifications to the OFF period extending circuit, in which the positions of a phototransistor differ.
Figure 7B:
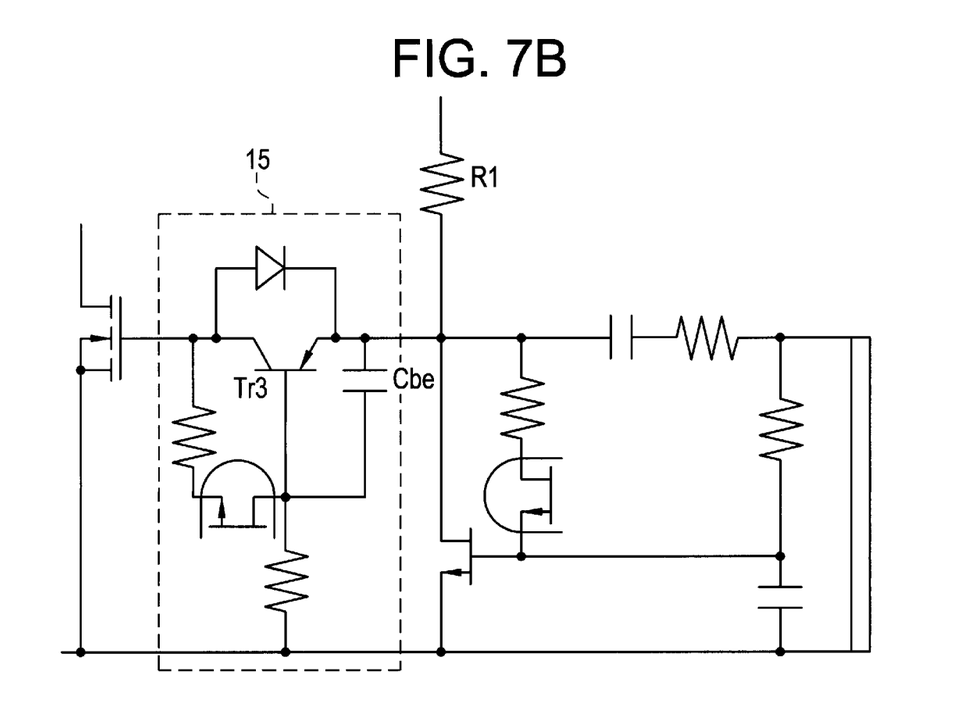

FIGS. 7A and 7B show modifications of the OFF period extending circuit 15. In the configuration shown in FIG. 4, the transistor Tr3 in the OFF period extending circuit 15 is connected in parallel to the FET Q1. In the modifications shown in FIGS. 7A and 7B, the transistor Tr3 is connected in series to the control terminal of the FET Q1. The transistor Tr3 remains turned off until a capacitor Cbe is charged to a threshold voltage (for example, approximately 0.6 volts), and turns on when the threshold voltage is reached, whereby an OFF period extended time is provided. Because a phototransistor 15PC4 must be turned off in a light load operation and turned on in a rated load operation, a light emitting device photo-coupled thereto (not shown) must be connected such that the light emitting device is turned off when a signal indicating a light load operation is input to the control terminal P1 of the detecting circuit 14 and turned on when a signal indicating a rated load operation is input. The location of the phototransistor 15PC4 may be at either of the positions shown in FIGS. 7A and 7B. In FIG. 7A, the impedance between the gate and the source of the FET Q1 decreases when the phototransistor 15PC4 is turned on, and thus activation conditions are confined. In FIG. 7B, the phototransistor 15PC4 exerts no effect, and thus activation conditions are improved.

Figure 8:
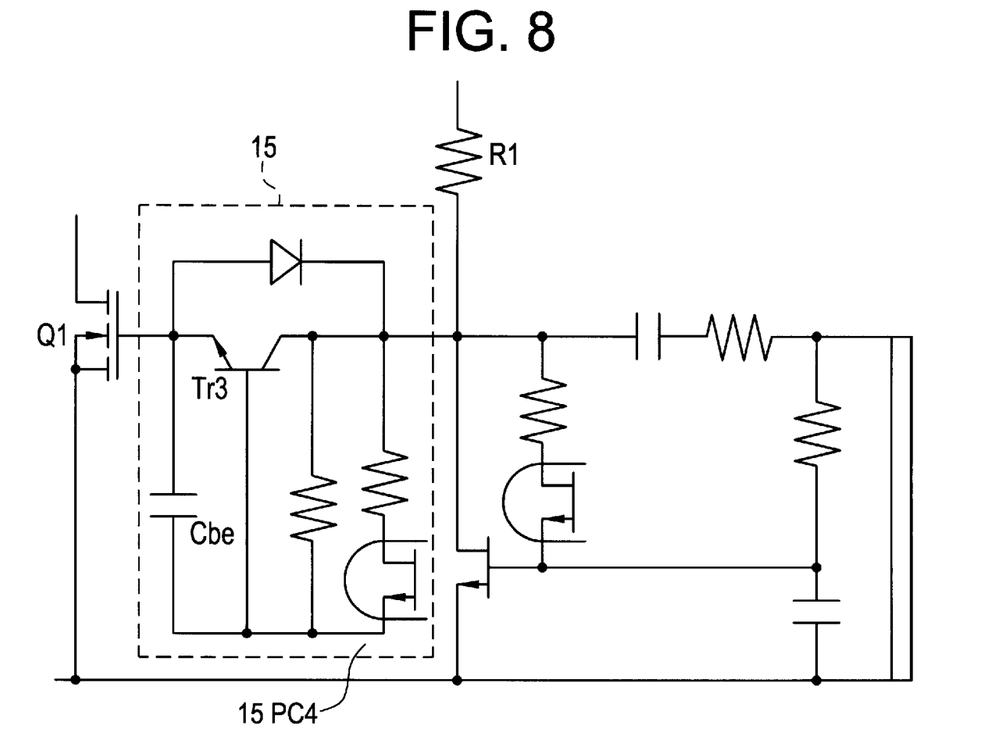
FIG. 8 is a circuit diagram of another modification of the OFF period extending circuit.

FIG. 8 shows another modification of the OFF period extending circuit 15. In the modifications shown in FIGS. 7A and 7B, a pnp transistor is used as the transistor Tr3, whereas in the modification shown in FIG. 8, an npn transistor is used as the transistor Tr3. In this circuit configuration as well, the phototransistor 15PC4 is turned off in a light load operation, such that the OFF period of the FET Q1 is extended until the capacitor Cbe is charged to the threshold voltage.

Figure 9:
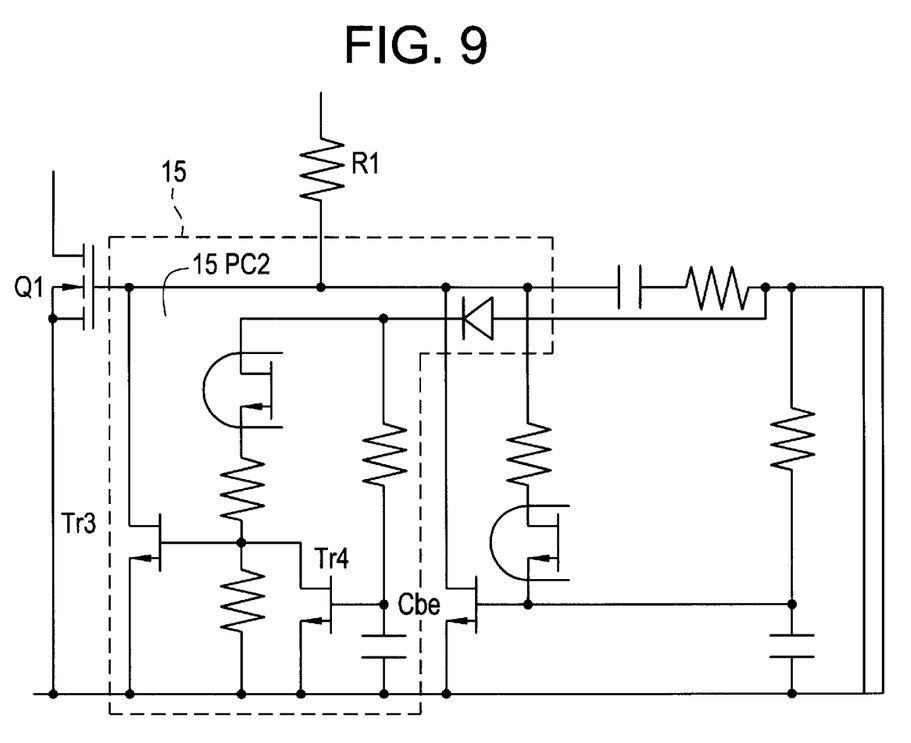
FIG. 9 is a circuit diagram of still another modification of the OFF period extending circuit.
Figure 10:
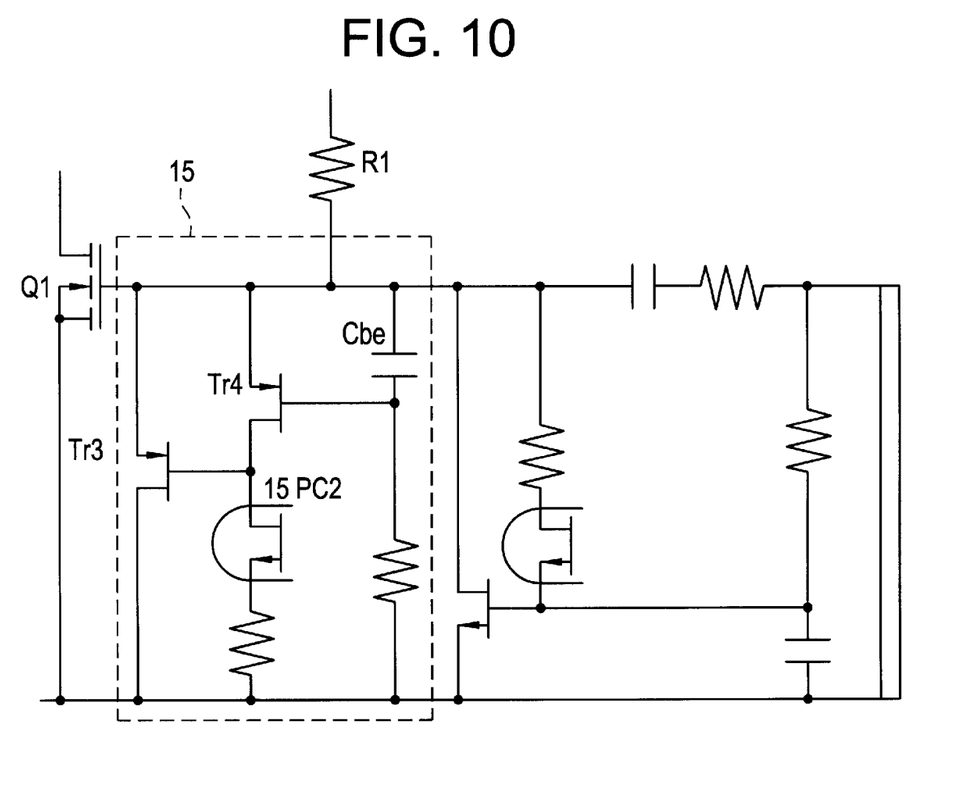
FIG. 10 is a circuit diagram of yet another modification of OFF period extending circuit.

FIGS. 9 and 10 show still other modifications. In these modifications, another transistor is connected to the transistor Tr3 to achieve accuracy of operation. In these modifications as well, the transistor Tr3 remains turned on until the capacitor Cbe is charged to the threshold voltage of the transistor Tr4 (for example, approximately 0.6 volts), such that the OFF period of the FET Q1 is extended. When the voltage on the capacitor Cbe reaches the threshold voltage, the transistor Tr4 is turned on and the transistor Tr3 is turned off, allowing the FET Q1 to be turned on. The phototransistor 15PC2 operates similarly to the phototransistor 15PC2 shown in FIG. 4.

Figure 11:
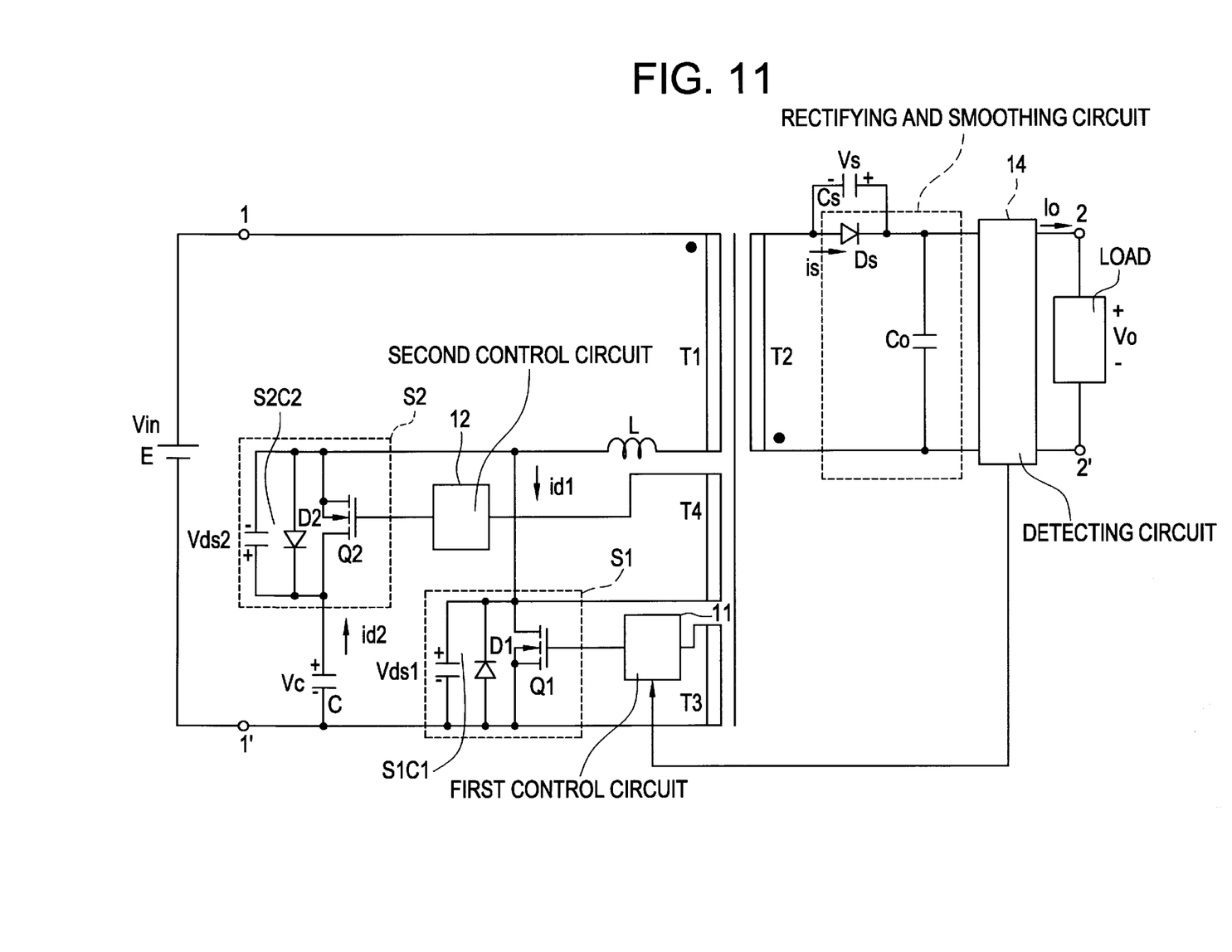
FIG. 11 is a diagram showing a modification of the connection of switching circuits.
Figure 12:
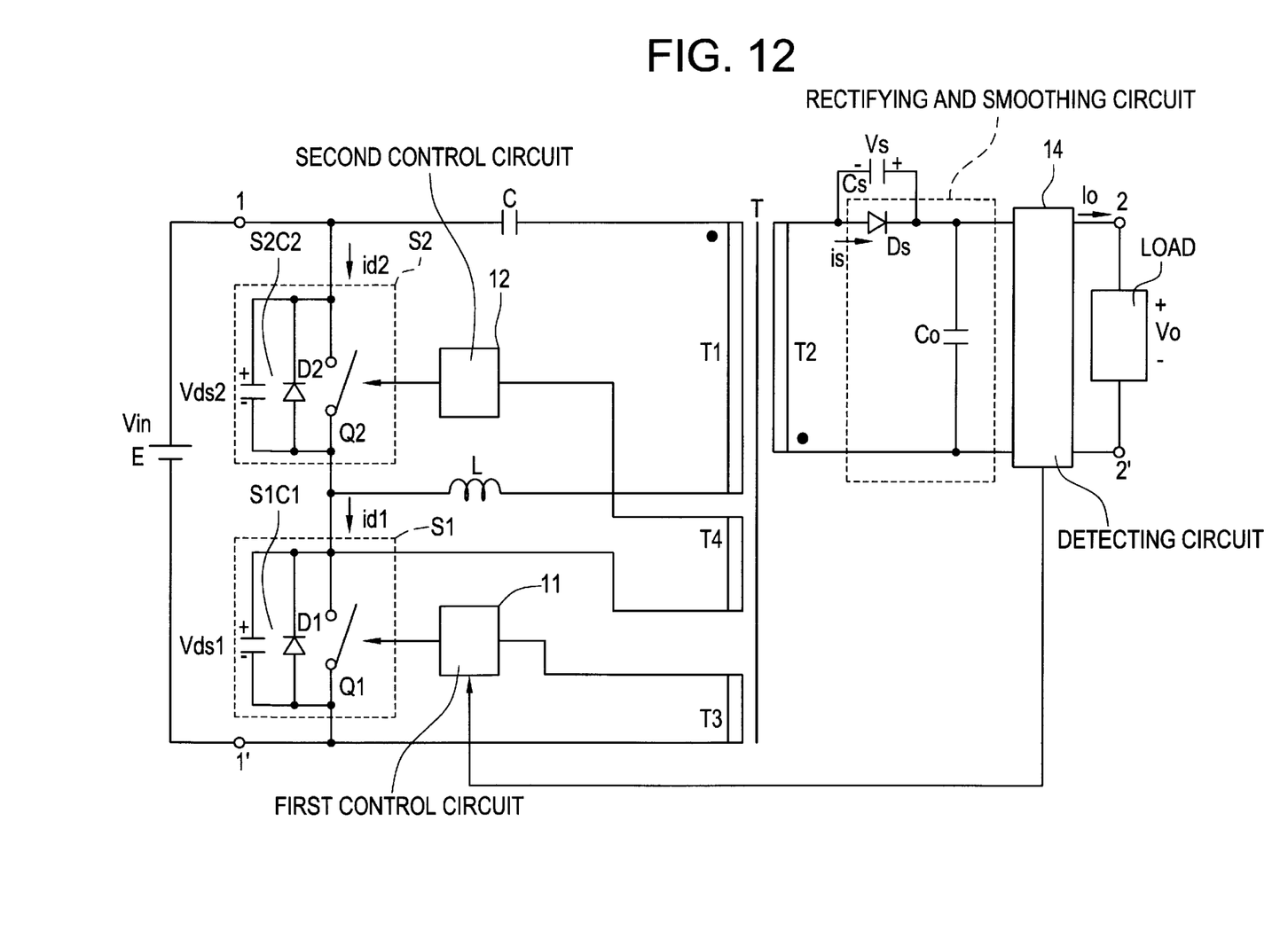
FIG. 12 is a diagram showing another modification of the connection of switching circuits.

FIGS. 11 and 12 are diagrams showing modifications of connection of the main components on the primary side of the transformer T. In FIG. 11, a series circuit of the second switching circuit S2 and the capacitor C is connected in parallel to the first switching circuit S1. In FIG. 12, a series circuit of the first switching circuit S1 and the second switching circuit S2 is connected in parallel to the input power supply E, and the second switching circuit S2 is connected in parallel to a series circuit of the capacitor C, the primary winding T1, and the inductor L.

The switching power supply units shown in FIGS. 11 and 12 operate similarly to the switching power supply unit according to preferred embodiments described above.

While preferred embodiments of the invention have been described above, it is to be understood that variations and modifications will be apparent to those skilled in the art without departing scope and spirit of the invention. The scope of the present invention, therefore, is to be determined solely by the following claims.

What is claimed is:

1. A switching power supply unit comprising:
   a first switching circuit including a parallel connection circuit including a first switching element, a first diode, and a first capacitor;
   a second switching circuit including a parallel connection circuit including a second switching element, a second diode, and a second capacitor;
   a third capacitor connected in series to said second switching circuit to define a series circuit of the third capacitor and said second switching circuit which is connected to one end of said first switching circuit;
   a transformer including a primary winding and a secondary winding;
   a rectifying and smoothing circuit including a rectifier element connected to the secondary winding of said transformer;
   an input power supply connected in series to said first switching circuit and said transformer; and
   a switching control circuit arranged to alternately turn said first switching element and said second switching element on and off with an intermediate period in which both of the first and second switching elements are turned off, such that energy is stored in the primary winding of said transformer during an ON period of said first switching element and the energy is discharged from the secondary winding of the transformer during an OFF period of said first switching element;
   wherein said switching control circuit includes an OFF period extending circuit which extends an OFF period of said first switching element for a time after the energy has been discharged from the secondary winding, thereby lowering the switching frequency.

2. A switching power supply unit according to claim 1, wherein said switching control circuit comprises a device for reducing an ON period of said second switching element to be shorter than a time required to discharge the energy from the secondary winding.

3. A switching power supply unit according to claim 1, wherein said OFF period extending circuit includes a transistor connected in series to a control terminal of said first switching element, the transistor remaining turned off after the energy has been discharged from the secondary winding, such that the OFF period of said first switching element is extended for a desired time.

4. A switching power supply unit according to claim 1, wherein said OFF period extending circuit includes a transistor connected in parallel to a control terminal of said first switching element, the transistor remaining turned on after the energy has been discharged from the secondary winding, such that the OFF period of said first switching element is extended for a desired time.

5. A switching power supply unit according to claim 1, wherein said switching control circuit comprises a transistor connected to a control terminal of said first switching element, and a time constant circuit including a capacitor and an impedance circuit connected to a control terminal of the transistor, such that the output voltage is controlled by controlling the ON period of said first switching element.

6. A switching power supply unit according to claim 1, wherein said switching control circuit comprises a transistor connected to a control terminal of said second switching element, and a time constant circuit including a capacitor and an impedance circuit connected to a control terminal of the transistor, such that the discharge current from the third capacitor connected in series to said second switching circuit is controlled by controlling the ON period of said second switching element.

7. A switching power supply unit according to claim 1, wherein said OFF period extending circuit is configured to operate in response to a signal in a light load operation, and not to operate in at least a heavy load operation.

8. A switching power supply unit according to claim 1, wherein said first switching element and said second switching element include field-effect transistors.

9. A switching power supply unit according to claim 1, wherein said transformer comprises a first drive winding and a second drive winding for generating voltages which turn on said first switching element and said second switching element to cause a self-excited oscillation.

10. A switching power supply unit according to claim 1, wherein said transformer comprises one of a leakage inductor induced in a magnetic circuit including the primary winding and the secondary winding, and an inductor connected in series to said transformer, and the inductor and said third capacitor define a resonant circuit.

11. A switching power supply unit according to claim 1, wherein said rectifying and smoothing circuit comprises a diode and a capacitive impedance being connected in parallel to the diode.

12. A switching power supply unit comprising:
   a first switching circuit including a first switching element;
   a second switching circuit including a second switching element;
   a capacitor connected in series to said second switching circuit and electrically connected to one end of said first switching circuit;
   a transformer including a primary winding and a secondary winding;
   a rectifying and smoothing circuit including a rectifier element connected to the secondary winding of said transformer;
   an input power supply connected in series to said first switching circuit and said transformer; and
   a switching control circuit arranged to alternately turn said first switching element and said second switching element on and off with an intermediate period in which both of the first and second switching elements are turned off, such that energy is stored in the primary winding of said transformer during an ON period of said first switching element and the energy is discharged from the secondary winding of the transformer during an OFF period of said first switching element;

wherein said switching control circuit includes an OFF period extending circuit which extends an OFF period of said first switching element for a time after the energy has been discharged from said secondary winding, thereby lowering the switching frequency.

13. A switching power supply unit according to claim 12, wherein said first switching circuit includes a parallel connection circuit including said first switching element, a first diode, and a first capacitor; and said second switching circuit includes a parallel connection circuit including said second switching element, a second diode, and a second capacitor.

14. A switching power supply unit according to claim 12, wherein said switching control circuit comprises a device for reducing an ON period of said second switching element to be shorter than a time required to discharge the energy from said secondary winding.

15. A switching power supply unit according to claim 12, wherein said OFF period extending circuit includes a transistor connected in series to a control terminal of said first switching element, the transistor remaining turned off after the energy has been discharged from the secondary winding, such that the OFF period of said first switching element is extended for a desired time.

16. A switching power supply unit according to claim 12, wherein said OFF period extending circuit includes a transistor connected in parallel to a control terminal of said first switching element, the transistor remaining turned on after the energy has been discharged from the secondary winding, so that the OFF period of said first switching element is extended for a desired time.

17. A switching power supply unit according to claim 12, wherein said switching control circuit comprises a transistor connected to a control terminal of said first switching element, and a time constant circuit defined by a capacitor and an impedance circuit connected to a control terminal of the transistor, such that the output voltage is controlled by controlling the ON period of said first switching element.

18. A switching power supply unit according to claim 12, wherein said switching control circuit comprises a transistor connected to a control terminal of said second switching element, and a time constant circuit including a capacitor and an impedance circuit connected to a control terminal of the transistor, such that the discharge current from the capacitor connected in series to said second switching circuit is controlled by controlling the ON period of said second switching element.

19. A switching power supply unit according to claim 12, wherein said OFF period extending circuit is configured to operate in response to a signal in a light load operation, and not to operate in at least a heavy load operation.

20. A switching power supply unit according to claim 12, wherein said first switching element and said second switching element include field-effect transistors.

21. A switching power supply unit according to claim 12, wherein said transformer comprises a first drive winding and a second drive winding for generating voltages which turn on said first switching element and said second switching element to cause a self-excited oscillation.

22. A switching power supply unit according to claim 12, wherein said transformer comprises one of a leakage inductor induced in a magnetic circuit including the primary winding and the secondary winding, and an inductor connected in series to said transformer, and the inductor and said capacitor define a resonant circuit.

23. A switching power supply unit according to claim 12, wherein said rectifying and smoothing circuit comprises a diode and a capacitive impedance being connected in parallel to the diode.

\* \* \* \* \*